US007014457B2

(12) United States Patent
Philips et al.

(10) Patent No.: US 7,014,457 B2
(45) Date of Patent: Mar. 21, 2006

(54) MOULD ASSEMBLY PROVIDED WITH CENTERING MEANS

(75) Inventors: Danny Maria Hubertus Philips, Son en Breugel (NL); Arie Gerrit Izaäk van der Velde, Kaatsheuvel (NL)

(73) Assignee: Axxicon Moulds Eindhoven B.V., Eindhoven (NL)

( * ) Notice: Subject to any disclaimer, the term of this patent is extended or adjusted under 35 U.S.C. 154(b) by 12 days.

(21) Appl. No.: 10/432,392

(22) PCT Filed: Nov. 21, 2001

(86) PCT No.: PCT/NL01/00845

§ 371 (c)(1),
(2), (4) Date: Dec. 9, 2003

(87) PCT Pub. No.: WO02/42049

PCT Pub. Date: May 30, 2002

(65) Prior Publication Data

US 2004/0096542 A1 May 20, 2004

(30) Foreign Application Priority Data

Nov. 21, 2000 (NL) .................................... 1016669

(51) Int. Cl.
*B29C 45/17* (2006.01)

(52) U.S. Cl. .................... 425/589; 425/450.1; 425/810

(58) Field of Classification Search ............. 425/450.1, 425/589, 810, 168
See application file for complete search history.

(56) References Cited

U.S. PATENT DOCUMENTS

| | | | | |
|---|---|---|---|---|
| 3,942,755 | A * | 3/1976 | Robinson | 249/162 |
| 5,388,982 | A | 2/1995 | Sakamoto et al. | |
| 5,776,517 | A | 7/1998 | Ciccone et al. | |
| 5,780,068 | A * | 7/1998 | Shinohara | 425/168 |
| 2002/0018827 | A1 * | 2/2002 | Yasuda et al. | 425/552 |
| 2003/0185930 | A1 * | 10/2003 | Hechtl | 425/542 |

FOREIGN PATENT DOCUMENTS

| | | |
|---|---|---|
| EP | 0 715 939 | 6/1996 |
| EP | 0 774 336 | 5/1997 |

OTHER PUBLICATIONS

Patent Abstracts of Japan, vol. 1997, No. 03, Mar. 31, 1997 & JP 08 300419 (Seiko Giken: KK; Sumitomo Heavy Ind Ltd), Nov. 19, 1996.

* cited by examiner

*Primary Examiner*—Donald Heckenberg
(74) *Attorney, Agent, or Firm*—Young & Thompson

(57) ABSTRACT

Mould assembly (1) consisting of two interacting mold sections (2, 3). One mold section is provided with a seat (4) and the other mould section with a body (5, 6) that is accurately accommodated by the seat (4), the body/seat interaction having a centering effect. The seat (4) is delimited by a series of ridge-shaped elements (8) that are arranged according to an annular shape. The rigidity thereof in the radial direction is greater than that in the axial direction.

9 Claims, 2 Drawing Sheets

MOULD ASSEMBLY PROVIDED WITH CENTERING MEANS

FIELD OF THE INVENTION

The present invention relates to a mould assembly comprising two mould sections which can be moved relative to one another and which delimit a mould cavity between them for injecting a plastic therein, which mould sections are provided with mutually interacting centring means, said centring means of one mould section comprising an annular seat and said centring means of the other mould section comprising an annular body, said body being embodied so as to fit tightly around the seat.

BACKGROUND OF THE INVENTION

In practice it is always necessary to centre the mould sections of, for example, injection moulding machines with respect to one another in order accurately to delimit the mould cavity. It has been observed that movement of mould sections relative to one another in a direction other than the closing direction is undesirable, certainly when injecting plastic. In a wide variety of processes plastic is introduced before the mould sections are completely closed, whilst, moreover, processes exist in which the mould cavity is never completely closed. A few such are known as praegen/coining venting. In the case of coining a quantity of plastic is introduced during closure, but this does not completely fill the mould cavity. Complete filing takes place during closure as a result of the reduction in size of the mould cavity. In this case of venting the mould opens after having been closed.

In all cases movement in the radial plane with respect to the direction of closure is undesirable. This applies in particular when injecting products with high accuracy. Optical information carries, such as CDs, DVDs and the like may be mentioned as an example. As the information density increases, ever more stringent requirements are being imposed on the peaks and troughs. Moreover, it has been found that with certain plastics the clarity thereof is reduced by mutual movement of the mould sections in the radial plane.

In the state of the art as described above, centring takes place with the aid of a cone. That is to say the body is of conical construction, whilst the seat is provided with a corresponding conical opening. However, in theory such a centring functions only in one position of the mutual movement of the mould sections, that is to say the position in which these parts touch one another. If contamination is present between the cone and the seat, the cone is pushed in one direction by said contamination and accurate centring can no longer be guaranteed.

In order to eliminate this disadvantage of centring only in one position, so-called block guides have been proposed in prior art. With these guides the mould sections are centred relative to one another over a longer path of the closing movement. However, the mechanical forces needed to achieve movement in such a guide are appreciable. After all, there may not be any play between the various parts because otherwise optimum guiding cannot be guaranteed. Moreover, there is the problem that on heating one of the mould sections either the play increases or jamming takes place between the parts of the block guide moving relative to one another, as a consequence of which the wear increases appreciably.

OBJECT OF THE INVENTION

The aim of the present invention is to obviate the disadvantages described above and to provided a guide for mould sections which is effective over an appreciable portion of the closing stroke of the mould sections with respect to one another and provides accurate guiding, with which no problems arise in the case of temperature differences between the mould sections and which does not disproportionately increase the forces for opening and closing the mould sections.

SUMMARY OF THE INVENTION

This aim is realised with a mould assembly as described above in that at least said seat or said body comprises at least five grooves extending to the free end thereof in order to delimit at least five adjacent elements for making clamping contact, around the periphery thereof, with said body or said seat, wherein, in the non-engaged position, the effective internal diameter of said seat is 1–100 $\mu$m smaller than the effective external diameter of said body.

According to the invention at least the body or the seat is constructed as a closed part in the form of a comb, wherein the comb is made up of a series of adjacent ridge-shaped elements that are separated from one another by grooves. With this arrangement the dimensions of the elements are chosen such that the strength in the radial direction is greater than the strength in the tangential direction. On the other hand, the ridge-shaped elements are plastically deformable to some extent under the opening and closing forces that arise. The various features are achieved in that the radial length is appreciably greater than the tangential length of each ridge-shaped element. Surprisingly, it has been found out that by this means a clamping force can be exerted on the other mould section that, on the one hand, is not so great that movement of the mould sections into and out of one another is substantially impeded but, on the other hand, provides centring. Moreover, it has been found that if contamination or the like is present between one of the ridge-shaped elements and the opposing mould section, only the ridge-shaped element concerned will deform and, as a result, centring still takes place in the desired manner.

Optimum "processing" is obtained if the difference in diameter is between 1 and 100 $\mu$m and more particularly between 1 and 50 $\mu$m.

As a result of the large number of elements, an error such as the above contamination will be averaged out.

The part in the form of a comb can have any closed peripheral shape, such as polygonal. Preferably it is made annular and more particularly elliptical and according to a further preferred embodiment circular.

In principle it is possible that according to the invention the parts moving relative to one another are in contact over the entire length thereof. That is to say the ridge-like elements press, over the entire "height" thereof, against the other mould section.

According to an advantageous embodiment of the invention either the ridge-shaped elements or the opposing part of the other mould section is provided with a thickening so that engagement takes place only along an annular line. That is to say, if the ridge-shaped elements are provided with an thickening, which preferably is made close to the free end thereof, when the other mould section is moved relative thereto a constant lever force is produced by the ridge-shaped elements.

If, on the other hand, the opposing part of the other mould section is provided with a thickening, this thickening will then slide over the ridge-shaped elements will shorten during said movement. That is to say, in case of a closing movement the lever length becomes increasingly shorter and the centring force consequently increasingly greater. A relatively low centring force can suffice at entering, which force increases as the mould sections are closed further with respect to one another.

The ridge-shaped elements can be arranged as a ring and act as a seat for a body to be accommodated therein. However, it is possible for a body to be arranged around these, that is to say for the ridge-shaped elements to be placed in a seat. Depending on the embodiment, movement of the ridge-shaped elements take place outwards or inwards.

According to the invention at least five ridge-shaped elements must be fitted. In practice, larger numbers of up to a few hundred will be used.

BRIEF DESCRIPTION OF THE DRAWINGS

The invention will be explained in more detail below with reference to illustrative embodiments shown in the drawings. In the drawing.

DETAILED DESCRIPTION OF THE INVENTION

Figure 1:
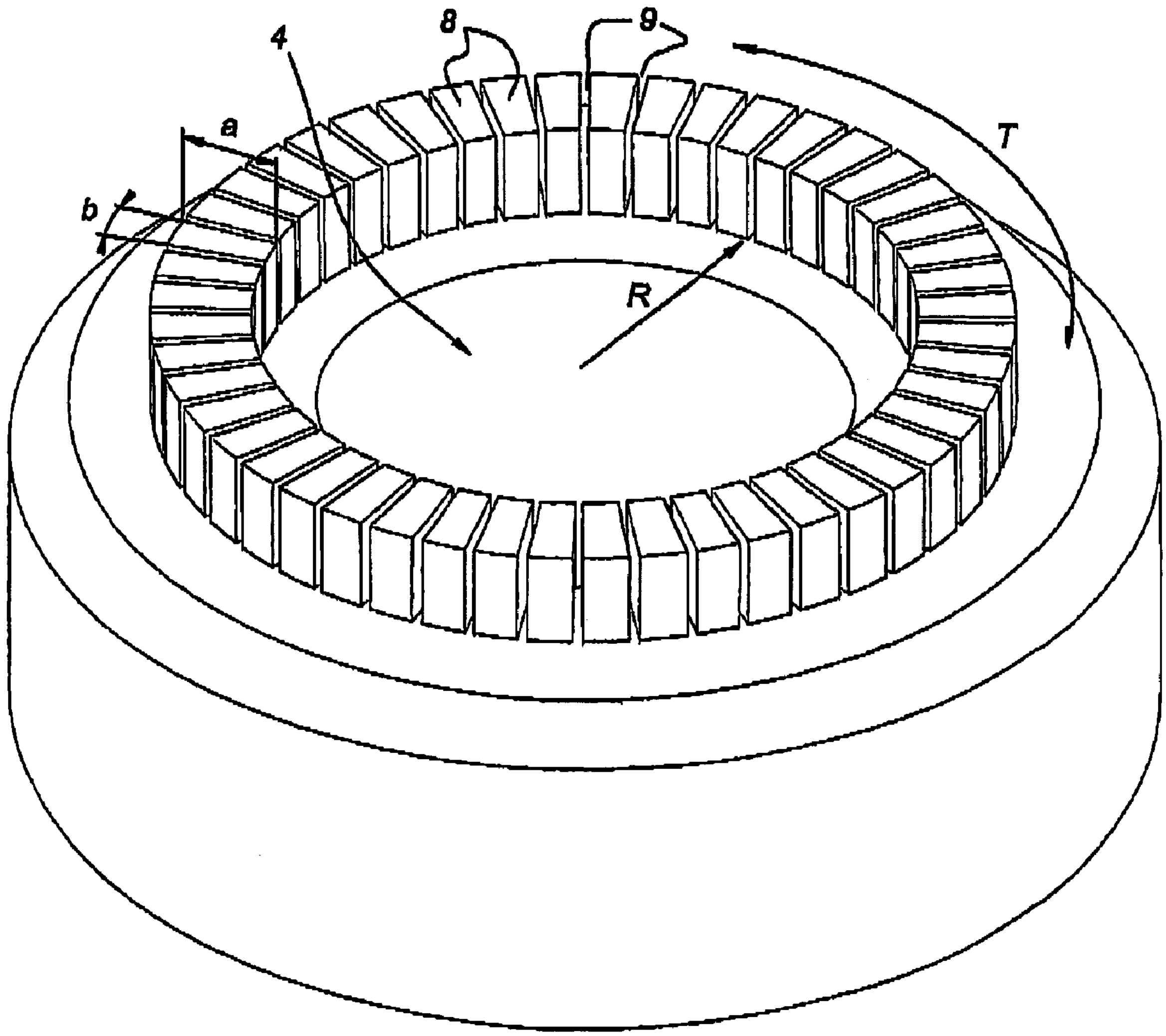
FIG. 1 shows, diagrammatically, a mould section provided with centring according to the invention.
Figure 2:
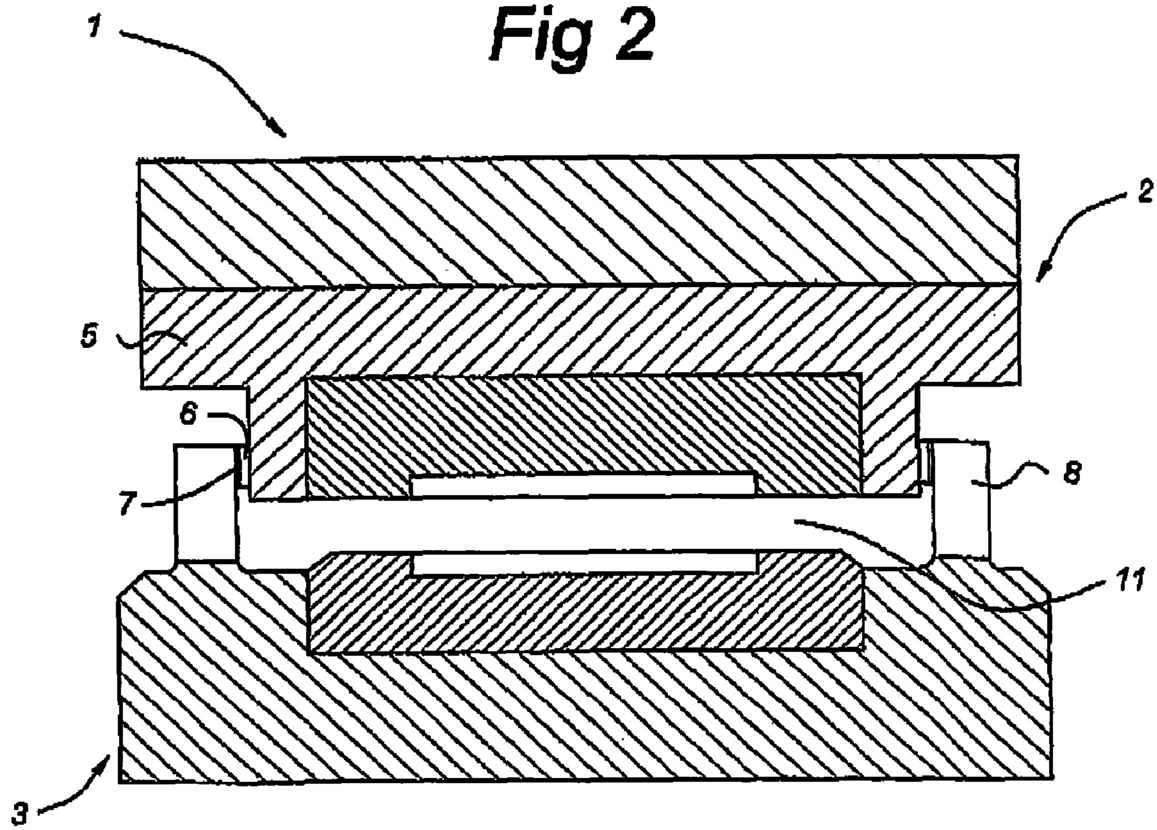
FIG. 2 shows, diagrammatically, the interaction of two mould sections according to the invention.
Figure 3:
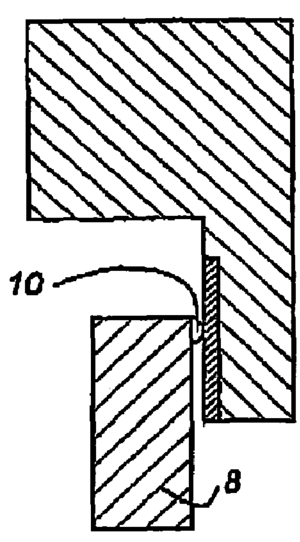
FIG. 3 shows a detail of the construction shown in FIG. 2.

The centring of two mould sections 2 and 3 which form part of a mould assembly 1 is shown in FIGS. 1–3. As can be seen from FIG. 1, the second mould second 3 is provided with a centring seat 4 delimited by a large number, for example a few tens, of ridge-shaped elements 8 between which grooves 9 have been made.

The radial length of these ridge-shaped elements is indicated by a, whilst the tangential length is indicated by b. The radial direction is indicated by R and the tangential direction by T. In this example the ridge-shaped elements are more rigid in the radial direction R than in the tangential direction T. That is to say, these elements are easily able to deflect laterally but are able to deflect in the radial direction only with difficulty. The grooves can, for example, be produced by spark erosion machining but also by any other method known in the state of the art. The material from which these ridge-shaped elements are made will in general be the same as the material of the mould section concerned. It will also be subjected to the same heat treatment. The dimensions of the ridge-shaped elements are so chosen that movements of a few hundredths of a millimeter at the free end thereof are possible without plastic deformation.

The way in which a solid centring body 5 provided with a solid centring sleeve 6 arranged around it is introduced into the centring seat 4 is shown in FIG. 2. This centring sleeve 6 can be provided with a surface coating 7. A mould cavity 11 is delimited between the mould sections, When the centring body or the centring sleeve 6 is moved inwards into the ridge-shaped elements 8 elastic deformation of the ridge-shaped elements 8 will take place as a result of the difference in size, the centring sleeve 6 being approximately 1–100 and more particularly approximately 1–5 $\mu$m larger in diameter than the centring seat 4. It has been found that such elastic deformation requires relatively little effort, as a result of which the force needed for moving the first and second mould sections 2 and 3 towards one another is relatively low. On the other hand this construction produces a particularly large centring effect, as a result of which particularly accurate centring of the mould sections with respect to one another is possible. The rigidity of the construction thus obtained is many times greater than the rigidity of the injection moulding machine, so that the requirements imposed by the manufactures are more than met. It will be understood that centring takes place continuously over the entire path for moving the centring sleeve 6 and the centring seat 4 towards one another as the centring sleeve 6 and the ridge-shaped elements 8 engage. This is in contrast to the prior art where centring is achieved by means of cones. As a result it is possible to carry out operations such as coining and venting without there being the risk that the mould sections move relative to one another in a plane perpendicular to the direction of closure.

A particular variant of the invention is shown in FIG. 3. The ridge-shaped elements 8 are provided with a peripheral thickening 10. As a result the centring sleeve 6 will engage exclusively on this boss-shaped thickening 10. A centring effect takes place continuously, always with the same force, because the lever constituted by the ridge-shaped element, that is to say the distance from the thickening 10 relative to the base of the second mould section, remains constant.

Figure 4:
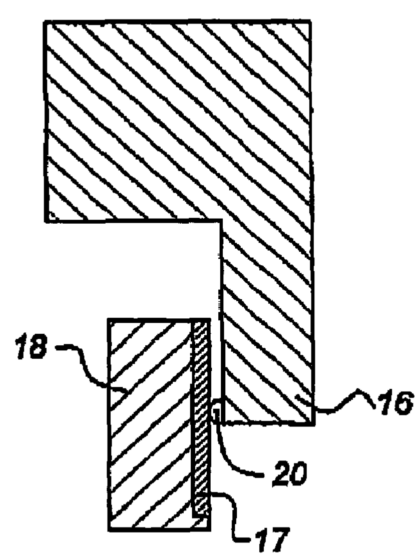
FIG. 4 shows a modified embodiment of the construction according to FIG. 3.

This is different in the case of the embodiment that is shown in FIG. 4. In this figure the centring sleeve is indicated by 16, the centring ridge shown by 18 and the coating applied thereto by 17. In this case the thickening is indicated by 20 and is positioned on the centring body. Engagement of the thickening 20 takes place at various "heights" of the ridge-shaped element shown, that is to say the lever action thereof changes on closing and the centring force increases on closing.

The structure described above is able in a simple manner to absorb alignment errors and to provide compensation for temperature differences. It is possible to absorb deviations of approximately 0–1 mm depending on the number of blocks and the diameter of the seat. The strength of each of the ridge-shaped elements in the radial direction is, as indicated above, much grater than that in the tangential direction. A factor of at least five is mentioned by way of example. In general the critical part of the closing movement is approximately 1 mm or less. The construction described above can be used for the injection moulding of any article that can be envisaged in the state of the art, but is used in particular for the injection moulding of optical information carriers and more particularly, DVDs. The mould is constructed accordingly.

Although we invention has been described above with reference to preferred embodiments, it will be understood that numerous modifications can be made thereto without going beyond the scope of the present application. Such modifications are immediately obvious to those skilled in the art on reading the above description and fall within the scope of the appended claims.

What is claimed is:

1. Mould assembly (1) comprising two mould sections (2,3) which can be moved relative to one another and which delimit a mould cavity (11) between them for injecting a plastic therein, which mould sections are provided with mutually interacting centering means, said centering means of one mould section comprising a seat (4) and said centering means of the other mould section comprising a body (5,6), said body being embodied so as to fit tightly in the seat, characterised in that at least said seat or said body comprises at least five grooves (9) extending to the free end thereof in order to delimit at least five adjacent elements (8) for making clamping contact around the periphery thereof, with said body or said seat, wherein, in the non-engaged position, the effective internal diameter of said seat is 1–100 $\mu$m smaller than the effective external diameter of said body.

2. Mould assembly according to claim 1, wherein said elements are provided close to the free end with a peripheral thickening (10) engaging on the body.

3. Mould assembly according to claim 1, wherein the free end of said body or said seat is provided with a peripheral thickening (20) engaging on the elements.

4. Mould assembly according to claim 1, wherein at least one of said contact surfaces between said elements and said body or said seat has a wear-resistant coating (7,17) that reduces friction.

5. Mould assembly according to claim 1, wherein said seat and said body are of circular cross-section.

6. Mould assembly according to claim 1, wherein said elements are embodied such that the mechanical strength thereof is greater in the radial direction (R) than in the tangential direction (T).

7. Mould assembly according to claim 1, wherein said body is essentially cylindrical.

8. Mould assembly according to claim 1, wherein said seat is essentially cylindrical.

9. Mould assembly according to claim 1, wherein said mould cavity is designed for the production of an optical information carrier.

* * * * *